Patented Jan. 2, 1951

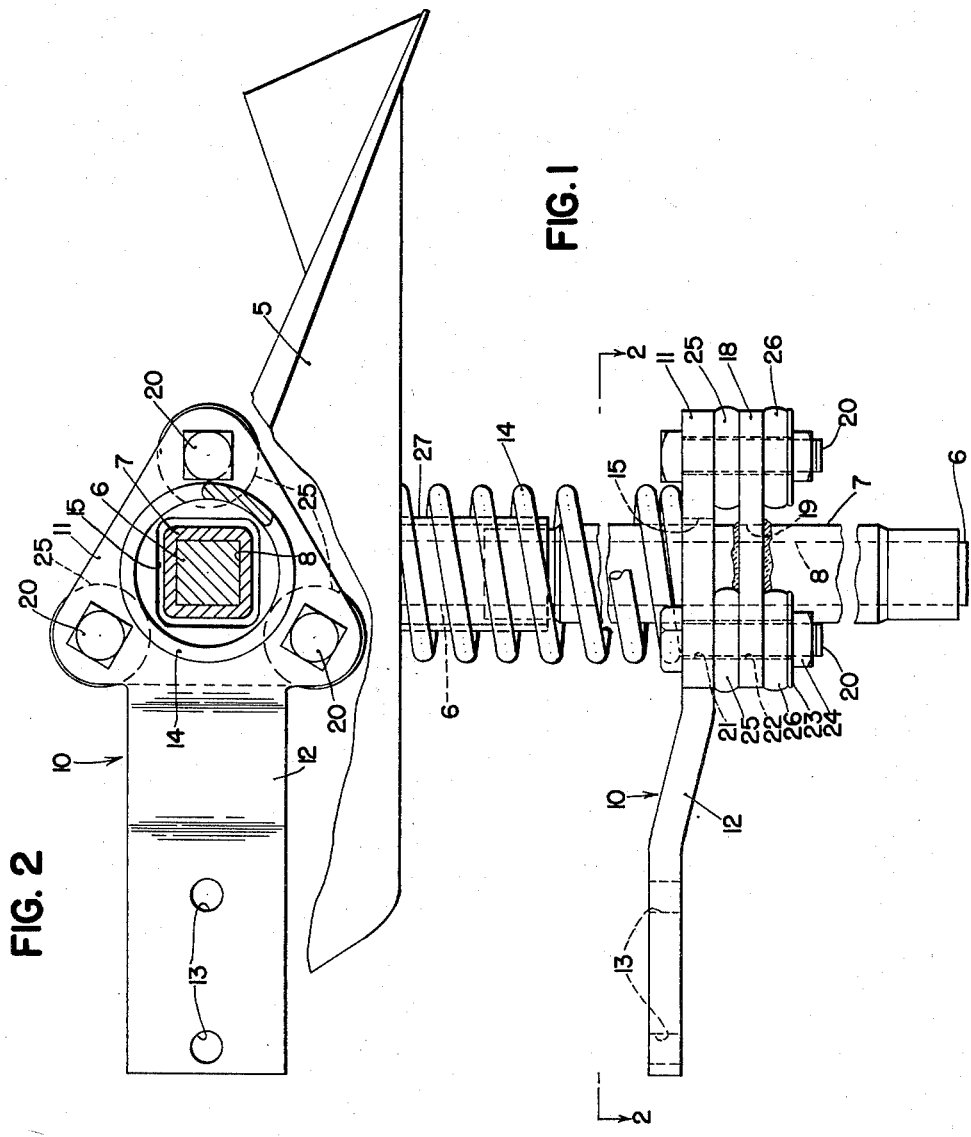

2,536,418

UNITED STATES PATENT OFFICE 2,536,418

RESILIENTLY MOUNTED SEAT

Theophilus Brown and Talbert W. Paul, Moline, Ill., assignors to Deere & Company, Moline, Ill., a corporation of Illinois Application July 19, 1944, Serial No. 545,574

8 Claims. (Cl. 155—51)

The present invention relates generally to seat mountings and more particularly to resilient mountings of the type provided for the operator's seat on tractors and various types of farm and other implements. The primary object of the present invention relates to the provision of a novel and improved resilient seat mounting which provides additional comfort and security for the occupant of the seat, but is simple, compact, and inexpensive to manufacture.

Heretofore, there have been many different designs of resilient seat mountings provided on tractors and other vehicles adapted for service over rough and uneven ground, and while many of these are sufficiently resilient to cushion the vertical shock, they have not made sufficient provision, as far as we are aware, for cushioning shocks caused by sudden lateral movements of the seat, such as are experienced as a result of one of the vehicle wheels suddenly dropping into a hole in the ground at one side of the implement or vehicle. Thus, the vertical component of the shock is absorbed by the conventional resilient seat mounting, but the seat is usually rigid in a transverse or horizontal direction. Therefore, a further and more specific object of our invention relates to the provision of a resilient mounting for seats, which includes provision for cushioning the seat against horizontal shock.

These and other objects and advantages of our invention will become apparent to those skilled in the art after a consideration of the following description, in which reference is had to the drawings appended hereto, in which Figure 1 is a side elevational view of a seat and a mounting means therefor embodying the principles of the present invention, and Figure 2 is a plan view of the mounting means, taken in section along a line 2—2 in Figure 1.

Referring now to the drawings, the seat is indicated by reference numeral 5 and is in the form of a conventional bucket type metal seat, the upper portion of which is broken away in Figure 1 to conserve space on the drawing. Seat 5 is mounted on a vertically disposed mounting post 6, which extends downwardly from the seat and through a vertical sleeve 7. The seat post 6 is square in cross section as indicated in Figure 2, and the sleeve 7 is internally square in cross section to receive the post 6 in longitudinally slidable relation.

The seat is carried on a supporting member 10, which comprises a generally triangular plate 11 carried at the end of a supporting shank 12. The shank 12 is provided with bolt holes 13 for the purpose of securing the shank to any suitable support on the tractor or implement. A helical spring 14 encircles the seat post 6 and sleeve 7 between the seat 5 and the triangular plate 11, and is stressed in compression by a weight on the seat 5. The spring 14 is yieldable downwardly to provide a cushioned support for the seat.

The sleeve 7 extends vertically through an enlarged aperture 15 in the center of the plate 11. The sleeve 7 is carried on a mounting plate 18 which has a central aperture 19 through which the sleeve 7 extends, and the latter is rigidly welded to the plate 18 to form a guiding member. The plate 18 is supported beneath the supporting plate 11 and is substantially the same size and shape as the triangular portion 11 of the supporting member 10.

Plate 18 is attached to the supporting plate 11 by means of three bolts 20, each of which extends through a pair of aligned bolt holes 21—22 in the supporting plate 11 and mounting plate 18 respectively. The lower end of each bolt is provided with a washer 23 and a nut 24 threaded on the end of the bolt 20 beneath the mounting plate 18. A plurality of rubber washers 25 encircle the bolts 20 between the mounting plate 18 and the supporting plate 11, while a second set of rubber washers 26 encircle the bolts 20 between the metal washers 23 and the mounting plate 18. The nuts 24 are tightened to draw the washers 23 and the plates 11 and 18 together, compressing the rubber washers 25—26 so that the seat post 6 is held upright, but there is sufficient yieldability in the rubber washers 25—26 to permit the guide sleeve 7 and seat post 6 to tilt either laterally or in a fore-and-aft direction, to a limited extent. The aperture 15 in the supporting plate 11, through which the sleeve 7 extends, is sufficiently large to permit this tilting movement.

During operation, the weight of the operator on the seat 5 partially compresses the compression spring 14, which resiliently supports his weight and acts as a cushion against vertical shocks transmitted through the supporting member 10. Any horizontal shocks that are transmitted through the supporting member 10 are at least partially absorbed by the rubber washers 25—26, which permit the seat post 6, sleeve 7, and mounting plate 18 to tilt relative to the supporting plate 11 to a limited extent, thereby cushioning the seat 5 against the horizontal shocks. It will be noted that the spring 14 acts independently of the resilient cushions 25—26 and vice versa.

The upper ends of the seat post 6 and sleeve 7 are covered by a protecting sleeve 27, which is fixed to the bottom of the seat 5 and serves to prevent dust and dirt from entering the top of the sleeve 7. Preferably, grease is applied to the seat post 6 to facilitate the movement through the sleeve.

We do not intend our invention to be limited to the use of rubber washers, for it will now be apparent to those skilled in the art that other types of resilient members or springs may be substituted for the rubber washers 25—26.

We claim:

1. In combination with a seat having a mounting post, a relatively fixed support therefor, a helical spring embracing said post and disposed between said seat and said support for supporting the seat and providing for downward yielding movement of the seat when loaded, guiding member telescopically related to said seat post and disposed in spaced relation to said support to provide for lateral movement of the guiding member and seat post relative to the support, said guiding member having a base portion adjacent but spaced from said support to accommodate the aforesaid lateral movement, and connecting means between said base portion and said support for confining said lateral movement to a limited extent, including a plurality of horizontally spaced resilient elements between said base portion and said support for yieldably supporting the guiding member and further confining said lateral movement to a limited amount of tilting movement of the guiding member and seat post relative to said support.

2. In combination with a seat having a mounting post, a relatively fixed support therefor, a helical spring embracing said post and disposed between said seat and said support for supporting the seat and providing for downward yielding movement of the seat when loaded, a guiding member telescopically related to said seat post and disposed in spaced relation to said support to provide for lateral movement of the guiding member and seat post relative to the support, said guiding member having a base portion adjacent but spaced from said support to accommodate the aforesaid lateral movement, bolt means loosely connecting said base portion with said support and providing for a limited amount of relative tilting movement therebetween, and rubber cushioning means between said base portion and said support and adapted to yieldably resist said limited amount of tilting movement of said guiding member and seat post relative to said support.

3. In combination with a seat having a mounting post, a guide sleeve telescopically disposed on said post, a relatively fixed supporting plate having an opening larger than the diameter of said sleeve for loosely receiving the latter, a base plate fixed to said sleeve, a plurality of horizontally spaced bolts extending through enlarged aligned openings in said base plate and said supporting plate, rubber cushioning means encircling each of said bolts on both sides of said base plate, washers on said bolts engaging certain of said rubber means on the side of the base plate opposite said supporting plate, and a helical spring embracing said post and disposed between said seat and one of said plates for resiliently supporting a load on said seat.

4. In combination with a seat having a mounting post, a guide sleeve telescopically disposed on said post, a relatively fixed supporting plate having an opening larger than the diameter of said sleeve for loosely receiving the latter, a base plate fixed to said sleeve and disposed beneath said supporting plate, a plurality of horizontally spaced bolts extending through enlarged aligned openings in said base plate and said supporting plate, rubber cushioning washers encircling each bolt between said plates and beneath said base plate, metal washers on said bolts beneath the lower rubber washers, and a helical spring bearing upon the top surface of said supporting plate and exerting a lifting force against said seat when a load is imposed on the latter, said rubber washers being adapted to yield to provide for a limited amount of cushioned tilting movement of the seat.

5. In a seat construction: a supporting member; a seat member; resilient means interposed between the seat member and supporting member for carrying the seat member and absorbing vertical loads imposed thereon; means for guiding the seat member vertically, including a pair of vertically telescopic parts, one connected rigidly to one member and the other having a portion disposed adjacent the other member; universally resilient means separate from the aforesaid resilient means and connecting said adjacent portion to the other of said members; and one of said members having means therein cooperable with the guiding means for limiting the universal movement of the guiding means.

6. In a seat construction: a support; a guide member; means including rubber cushioning elements interposed between the support and guide member for carrying the guide member on the support for substantially universal yielding movement thereof with respect to the support in response to the application of generally horizontal forces to said guide member; the support having means therein cooperable with the guide member for limiting the aforesaid movement between the support and guide member; a seat; means yieldably carrying the seat on the support including a resilient element separate from the rubber cushioning elements and interposed between the seat and support for absorbing vertical loads imposed on the seat; and means connecting the seat to the guide member providing for relative vertical movement between the two, including a member on the seat vertically telescoped in the guide member.

7. In a seat construction: a support; a guiding member; means including rubber cushioning elements interposed between the support and guide member for carrying the guide member on the support for substantially universal yielding movement thereof with respect to the support in response to the application of generally horizontal forces to said guide member; the support having means therein cooperable with the guide member for limiting the aforesaid movement between the support and guide member; a seat; means connecting the seat to the guide member for vertical movement thereof with respect to the guide member and including a member on the seat vertically telescoped in the guide member; a resilient means carrying the seat on the support, including a coil spring encircling the telescoped member and guide and interposed between the seat and support for absorbing vertical loads imposed on the seat.

8. In a seat construction: a support including a generally horizontal plate having a central vertical aperture; a second plate disposed generally horizontally and in vertically spaced relation to the first plate and having an aperture aligned with the aperture in the first plate; means including a plurality of rubber cushion elements resiliently supporting the second plate on the first for relative yielding movement of the plates; a vertical guide member extending through the apertures in the plates; means rigidly securing the guide member to the second plate; the relative dimensions of the guide member and the aperture in the first plate being such that the guide member passes loosely through said aperture; a seat disposed above the guide member and having a depending portion telescopically fitting the guide member to provide for relative vertical movement between the seat and guide member; and resilient means interposed between the first plate and the seat to absorb vertical loads imposed on the latter.

THEOPHILUS BROWN.
TALBERT W. PAUL.

REFERENCES CITED

The following references are of record in the file of this patent:

UNITED STATES PATENTS

| Number | Name | Date |
|---|---|---|
| 75,306 | Smith | Mar. 10, 1868 |
| 401,179 | Lea | Apr. 9, 1889 |
| 1,151,164 | Davis | Aug. 24, 1915 |
| 1,359,528 | Reed | Nov. 23, 1920 |
| 1,445,516 | Jones | Feb. 13, 1923 |
| 1,668,014 | Hansen | May 1, 1928 |
| 1,692,685 | Newman | Nov. 20, 1928 |
| 1,702,883 | Wilson | Feb. 19, 1929 |
| 1,722,678 | Peterson | July 30, 1929 |
| 1,734,776 | Pallenberg | Nov. 5, 1929 |
| 2,131,963 | Mendell | Oct. 4, 1938 |